(12) United States Patent
Ritchie et al.

(10) Patent No.: US 12,155,507 B2
(45) Date of Patent: Nov. 26, 2024

(54) SYSTEMS AND METHODS FOR AUTOMATED NETWORK CONFIGURATIONS WITH A NETWORK AS A SERVICE (NAAS) SYSTEM

(71) Applicant: Level 3 Communications, LLC, Broomfield, CO (US)

(72) Inventors: Austin Ritchie, Parker, CO (US); Scott Hemmann, Ballwin, MO (US); Wen Wang, Ballwin, MO (US); Brett Dwyer, Clermont, FL (US)

(73) Assignee: Level 3 Commmunications, LLC, Denver, CO (US)

( * ) Notice: Subject to any disclaimer, the term of this patent is extended or adjusted under 35 U.S.C. 154(b) by 367 days.

(21) Appl. No.: 17/564,461

(22) Filed: Dec. 29, 2021

(65) Prior Publication Data

US 2022/0209991 A1 Jun. 30, 2022

Related U.S. Application Data

(60) Provisional application No. 63/132,696, filed on Dec. 31, 2020, provisional application No. 63/132,212, filed on Dec. 30, 2020.

(51) Int. Cl.
*H04L 12/46* (2006.01)
*H04L 41/12* (2022.01)
(Continued)

(52) U.S. Cl.
CPC .......... *H04L 12/4641* (2013.01); *H04L 45/48* (2013.01); *H04L 49/15* (2013.01); *H04L 41/12* (2013.01)

(58) Field of Classification Search
CPC ..... H04L 12/4641; H04L 45/48; H04L 49/15; H04L 41/12
See application file for complete search history.

(56) References Cited

U.S. PATENT DOCUMENTS

| 2012/0147894 A1 | 6/2012 | Mulligan et al. |
| 2020/0007414 A1* | 1/2020 | Smith .............. H04L 67/12 |
| 2020/0396176 A1 | 12/2020 | Lochhead |

FOREIGN PATENT DOCUMENTS

| EP | 3139271 | 3/2017 |
| WO | WO-2017023256 | 2/2017 |
| WO | WO-2022026679 | 2/2022 |

OTHER PUBLICATIONS

International Search Report and Written Opinion of the International Searching Authority, dated Apr. 14, 2022, Int'l Appl. No. PCT/US21/065510, Int'l Filing Date Dec. 29, 2021; 15 pgs.

(Continued)

*Primary Examiner* — Mohammad S Anwar

(57) ABSTRACT

A system and method for providing on-demand edge compute. The system may include an orchestrator that provides a UI and controls an abstraction layer for implementing a workflow for providing on-demand edge compute. The abstraction layer may include a network configuration orchestration (NCO) system (e.g., a Network-as-a-Service (NaaS) system) and an API that may provide an interface between the orchestrator and the NCO. The API may enable the orchestrator to communicate with the NCO for receiving requests that enable the NCO to integrate with existing network controllers, orchestrators, and other systems and perform various network provisioning tasks (e.g., to build and provision a communication path between server instances). The various tasks, when executed, may provide end-to-end automated network provisioning services as part of providing on-demand edge compute service to users. The API may further enable the ECS orchestrator to receive information from the NCO, (e.g., network resource information, status messages).

16 Claims, 7 Drawing Sheets

(51) Int. Cl.
*H04L 45/48* (2022.01)
*H04L 49/15* (2022.01)

(56) References Cited

OTHER PUBLICATIONS

International Search Report and Written Opinion of the International Searching Authority, dated Jun. 8, 2022, Int'l Appl. No. PCT/US21/065492, Int'l Filing Date Dec. 29, 2021; 19 pgs.

Chirivella-Perez, Enrique et al., "Orchestration Archtecture for Automatic Deployment of 5G Services from Bare Metal in Mobile Edge Computing Infrastructure", *Wireless Communications and Mobile Computing* vol. 2018, Article ID 5786936, Nov. 22, 2018, pp. 1-18.

Doan, Tung V. et al., "APMEC: An Automated Provisioning Framework for Multi-access Edge Computing", ARXIV.org, Cornell University Library, 201 Olin Library Cornell Univ. Ithaca, NY 14853' XP080881612, May 9, 2018, 8 pgs.

International Preliminary Report on Patentability, dated Jul. 13, 2023, Int'l Appl. No. PCT/US2021/065492, Int'l Filing Date Dec. 29, 2021; 14 pgs.

International Preliminary Report on Patentability, dated Jul. 13, 2023, Int'l Appl. No. PCT/US2021/065510, Int'l Filing Date Dec. 29, 2021; 12 pgs.

* cited by examiner

SYSTEMS AND METHODS FOR AUTOMATED NETWORK CONFIGURATIONS WITH A NETWORK AS A SERVICE (NAAS) SYSTEM

CROSS REFERENCE TO RELATED APPLICATIONS

This application claims the benefit of U.S. Provisional Patent Application No. 63/132,696, titled "CUSTOMER ACTIVATION ON EDGE COMPUTING ENVIRONMENT," filed Dec. 31, 2020, and U.S. Provisional Application No. 63/132,212, titled "SYSTEMS AND METHODS FOR AUTOMATED NETWORK CONFIGURATIONS WITH A NETWORK AS A SERVICE (NAAS) SYSTEM," filed Dec. 30, 2020, each of which is incorporated by reference herein in its entirety.

This application is related to U.S. patent application Ser. No. 17/564,829, titled "CUSTOMER ACTIVATION ON EDGE COMPUTING ENVIRONMENT," filed by Applicant on even date herewith, which is incorporated by reference herein in its entirety.

This application is related to U.S. Pat. No. 10,652,110, titled "PROVISIONING DEDICATED NETWORK RESOURCES WITH API SERVICES," issued on May 12, 2020, and U.S. Pat. No. 10,742,447, titled "CONNECTING TO MULTIPLE CLOUD INSTANCES IN A TELECOMMUNICATIONS NETWORK," issued on Aug. 11, 2020, each of which is incorporated by reference herein in its entirety.

BACKGROUND

The provisioning of an edge computing service starts with building a server, either virtual or bare metal. From the server build, the network requirements can be defined. These network requirements are then sent to a network team that builds ports on the switch and installs routing on a large router. This process is very resource and time intensive. Further, the processes are further complicated as the network and the processes to build the network are different based on the provider, geographic area, etc. It is with these observations in mind, among other, that aspects of the present disclosure were conceived.

SUMMARY

Aspects of the present disclosure provide on-demand compute and network orchestration and configuration in an edge computing network environment. Accordingly, the present disclosure describes a method for providing automated network configuration for edge compute, comprising: receiving a request for a user server instance in an edge compute network; translating the request into compute provisioning tasks and networking provisioning tasks; and causing a network configurator in communication with network resources to execute the networking provisioning tasks, wherein the network provisioning tasks comprise: reserving a VLAN for the user server instance on a first port of a first network resource connected to a compute resource; configuring the first port of the first network resource to translate VLAN communications between the compute resource and the first network resource; automatically discovering a path between the first network resource and an egress network resource in the edge compute network; and building the path between the first network resource and the egress network resource as the path is discovered.

The present disclosure further describes a system for providing automated network configuration for edge compute, the system comprising: at least one processor; memory operatively connected to the at least one processor and storing instructions that, when executed by the at least one processor, cause the system to: receive a request for a user server instance in an edge compute network; translate the request into compute provisioning tasks and networking provisioning tasks; and causing a network configurator in communication with network resources to perform the network provisioning tasks, including: reserve a VLAN for the user server instance on a first port of a first network resource connected to a compute resource; configure the first port of the first network resource to translate VLAN communications between the compute resource and the first network resource; automatically discover a path between the first network resource and an egress network resource in the edge compute network; and build the path between the first network resource and the egress network resource as the path is discovered.

Additionally, the present disclosure describes a system for providing system for providing on-demand edge compute, wherein the system is operative to: receive a user request for a user server instance in an edge compute network; and call an application programming interface (API) of a network configuration orchestrator to open communication between an edge compute system orchestrator and a network configurator in communication with network resources to: gather network resources for a network configuration for the user server instance; identify a network resource connected to a reserved compute resource; reserve a VLAN on the network resource for the user server instance; configure the network resource to point to the user server instance; configure a path; configure network service; validate network connectivity; and upon validation of network connectivity to the user server instance, provide a success message including an IP address of the user server instance.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

Figure 1:
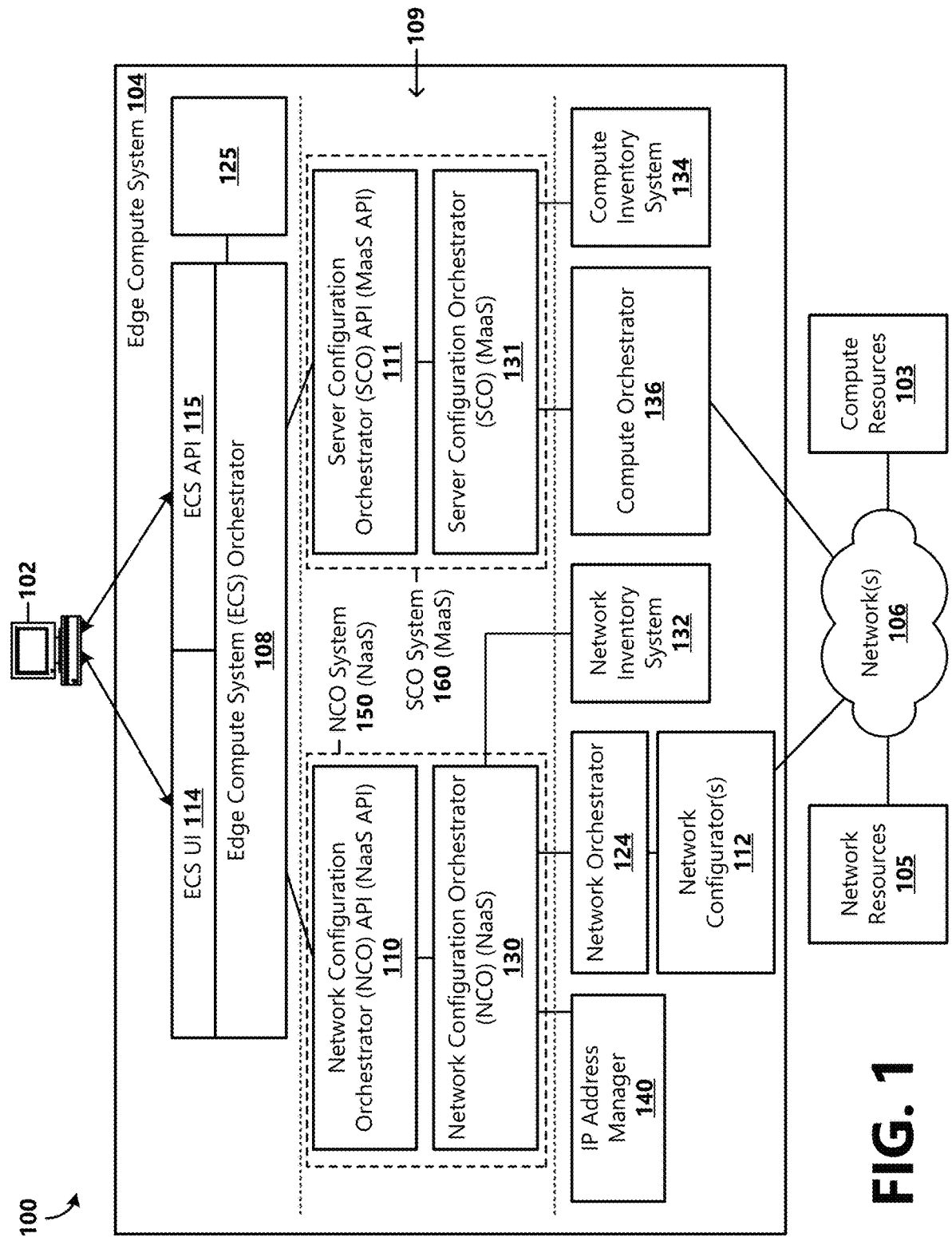
FIG. 1 is a block diagram illustrating an operating environment in which an edge compute system may be implemented for providing on-demand compute and network orchestration and configuration in an edge computing network environment according to an example.

Communications networks may provide various services to customers of the network, including transmission of communications between network devices, network services, network computing environments, cloud services (e.g., storage services, networking service, compute services), and the like. To provide such services, networking components and other devices are interconnected and configured within the network such that customers may access the services. Hosted servers may provide low-cost compute resources on which customers, such as enterprises and service providers, can configure an operating system to run applications. For example, the servers may reside at various locations in various networks. Such locations may include edge nodes. An edge node, for example, may be on-premises or at a service location near a point of digital interaction. That is, providing edge compute services to users may include delivering technology services (e.g., data processing, storage, security services, other application services) from a low-latency location near a point of digital interaction. In some cases, a level of latency can render some applications, such as VoIP, online gaming, or other latency-sensitive or data-intensive applications (e.g., low latency 5G, IoT, augmented reality services, virtual reality services) unusable. Accordingly, a user may want to distribute such applications at a plurality of edge nodes throughout one or more networks. As another example, a user may want to implement an edge compute environment in a communications network for enabling a hybrid IT environment, where enterprise computing solutions may leverage multiple IT infrastructures (e.g., on-premises equipment, public clouds, and/or private clouds).

In one example, a process of instantiating an edge compute environment at an edge node in a communications network may include various operations, such as accessing the server and network components and configuring settings, ports, operating systems, etc., of the server and network components to enable the communications network to deliver technology services to end users. Typically, an edge node may be preconfigured for instantiating a server instance. For example, the edge node may include a prebuilt network, which may include a set of shared resources (e.g., servers, a range of VLANs (Virtual LANs), and other network components) that may be preconfigured in the communications network that a new server instance may then be built on. As can be appreciated, utilization of a prebuilt and preconfigured network can be prone to security risks and may not provide flexibility in controlling and defining how a path is built to connect the customer server instance to other server instances and/or to a network core (e.g., Internet core).

Aspects of the present disclosure provide a system and method for providing on-demand edge computing services and networking. According to an example, an edge compute system may provide customer-activated configuration, deployment, and management of an edge compute environment in a communications network. The edge compute system may provide a user interface via which a customer is able to procure edge compute resources and connectivity for hosting a customer application or service on demand. For example, based on customer selections via the user interface, a customer server instance may be deployed at an edge location and connected to other customer server instances via a customized network path defined and built at build time. Being able to configure the network at build time, rather than reusing a prebuilt network for the edge compute resource provides technical advantages, such as but not limited to, increased inherent security advantages, increased flexibility in controlling and defining the network path, and increased and in flexibility in controlling and defining customer services.

With reference to FIG. 1, a communication environment 100 is illustrated in which an edge compute system 104 may be implemented for providing on-demand service and network orchestration and configuration, according to an example. The communication environment 100 may include an edge compute system 104 that may interface one or more users 102 and one or more networks 106. As will be described in further detail below, the edge compute system 104 may generally operate as an edge compute orchestration and management platform. In one example, the edge compute system 104 may be operative to automate an on-demand build of a bare metal server instances in an edge computing network environment. In another example, the edge compute system 104 may further operate to define and build a network between bare metal server instances at build time.

An edge computing network environment may include server hardware, herein referred to as a compute resource 103, that may connect to the network 106 at an edge compute node. In some examples, the compute resource 103 may include bare metal servers, which may also be referred to as white box servers or common-off-the-shelf servers, which may be configured to provide computing resources with no virtualization layer or operating system on top. In other examples, the compute resource 103 may include a virtual machine that may operate to run on top of a bare metal server with a set of application programming interfaces (APIs). The compute resource 103 may be used to build an operating system on for hosting an application or other service workload. For example, a user 102 may want to move an application to an edge compute node to better serve its customers, for example, for scaling to demand, to minimize latency, to provide high performance application capabilities, to improve security, and/or other reasons.

For example, the user 102 may represent a Local Area Network (LAN), a virtual LAN (VLAN), a computing system, another network, etc. The network 106 can represent any type of local, distant, wireless, or other type of network. For example, the network 106 may represent one or more of a local area network (LAN), a wide area network (WAN), a wireless LAN (WLAN), the Internet, etc. Further, the network 106 can represent a combination of two or more of the aforementioned network types. According to an example, the network 106 may be a fiber network. According to another example, the network 106 may be a global fiber network comprising millions of miles of high-capacity, low-loss fiber. For instance, the network 106 may include a plurality of edge compute nodes distributed throughout the network 106. In some examples, the plurality of edge compute nodes may be distributed across various locations (e.g., regions, countries, and/or continents). The network 106 and the distributed edge compute nodes may be leveraged by the edge compute system 104 to provide on-demand automated server and networking deployment.

In some examples, the edge compute system 104 includes an Edge Compute System (ECS) Orchestrator 108 that provides a user interface (UI) 114 and an API 115. The ECS orchestrator 108 may be a software development kit that allows the user 102 to interface with the edge compute system 104. For example, a server configuration orchestrator (SCO) 131 and a network configuration orchestrator (NCO) 130 may operate as API-defined compute and network controllers that can automatically complete the provisioning a server instance on a compute resource 103 and the provisioning of network services between server instances, to the Internet, and/or to the user's private systems based on instructions received from the ECS orchestrator 108.

A user 102 may provide edge computing requests to the ECS orchestrator 108 through the UI 114 and/or API 115. In some examples, the user 102 may use the UI 114 to submit a request for a server edge compute service. For instance, the request for edge compute service may be associated with a request for an edge compute service to be deployed at an edge node. The UI 114 may present various input fields that may operate to receive user inputs of criteria for the server instance. Example server instance criteria may include a server size, a market area and/or geographic location, and/or an operating system type. Other example criteria may include latency requirements, bandwidth requirements, cost/pricing, security requirements, etc. According to an example, the user 102 may want to place a latency-sensitive or data-intensive application or service (e.g., low latency 5G, IoT, augmented reality services, virtual reality services, VoIP service, online game) to an edge node near a geographic location where demand for the user's services may be increasing and the user 102 may require additional computing resources to provide quality application or service performance. In some examples, the user 102 may additionally specify a desired or minimum-acceptable latency level for providing quality application performance. Other criteria may be provided by the user 102 or provided by another data source.

In some examples, the UI 114 may send the user request to the ECS orchestrator 108, where the request may be interpreted to determine what the user is requesting and how an abstraction layer 109 (e.g., a server configuration orchestration system 160 and a network configuration orchestrator system 150) may fulfill the request. In some examples, the interpreted request may be processed by a generalization and/or standardization layer. For example, the edge compute orchestrator 104 may include a generalization layer that may operate to generalize the compute and network requirements or configurations provided by the abstraction layer 109 to mate or match with the generalized requests from the user 102. Further, the edge compute orchestrator 104 can also interpret the generalized requests into a set of tasks or requirements for the abstraction layer 109. The edge compute orchestrator 104 may further include a standardization layer that may operate to standardize the various compute and network requirements/architectures requirements into a standard set of tasks that may be presented to and then requested by the user 102. These standardized requests can also be sent to the abstraction layer 109 or to the generalization layer.

In some examples, the abstraction layer 109 may include a server configuration orchestration (SCO) system 160, which may sometimes be referred to as a Metal-as-a-Service (MaaS) system. For example, the SCO system 160 may include a server configuration orchestrator (SCO) API 111 that may operate provide an interface between the ECS orchestrator 108 and the SCO 131. For example, the SCO API 111 may enable the ECS orchestrator 108 to communicate with the SCO 131 for receiving requests that enable the SCO 131 to integrate with existing compute resources 103 and other systems to perform various compute provisioning tasks (e.g., to build and provision a server instance) that may be included in a workflow method that may be executed by the ECS orchestrator 108. For example, the various compute provisioning tasks, when executed, may provide on-demand edge compute service to the user 102. The SCO API 111 may further enable the ECS orchestrator 108 to receive information from the SCO 131, such as compute resource information, status messages, etc. In some implementations, the SCO system 160 may be configured to receive requests directly from the user 102.

In some examples, the ECS orchestrator 108 may include or may be in communication with a recommendation engine 125 that may operate to provide one or more compute resource 103 and/or network configuration recommendations, for example, based on criteria received from the user 102. In some examples, the ECS orchestrator 108 may further operate to communicate with other internal systems, such as a billing system that may provide customer information, an authentication system, etc.

In some examples, the SCO system 160 may operate to interface various data sources, for example, for retrieving data for building, operating, and maintaining a server instance in an edge compute environment. The data sources may include internal and/or external data sources. Some example internal data sources may include location databases that may identify a location relevant to provisioning a server instance, a compute inventory database 134 that may store and manage an inventory of compute resources 103, and other data sources. External data sources, for example, may include an affiliate partner's API(s), for example, for enabling authentication and/or authorization of a user 102 for access to negotiated terms (e.g., pricing discounts). Other example internal data sources and/or external data sources are possible and are within the scope of the present disclosure.

In some examples, the SCO system 160 may further operate to interface a compute orchestrator 136. The compute orchestrator 136 may operate interact with one or more compute resources 103 in the network(s) 106. According to an example, the compute orchestrator 136 may operate to reserve compute resources 103 in the network 106, deploy server instances on compute resources 103, apply configurations, wipe compute resources 103, release compute resources 103, and/or perform other edge compute service provisioning interactions based on the requirements sent from the ECS orchestrator 108.

In some examples, the abstraction layer 109 may further include a network configuration orchestration (NCO) system 150, which may sometimes be referred to as a Network-as-a-Service (NaaS) system. For example, the NCO system 150 may include a network configuration orchestrator (NCO) API 110 that may operate to provide an interface between the ECS orchestrator 108 and the NCO 130. For example, the NCO API 110 may enable the ECS orchestrator 108 to communicate with the NCO 130 for receiving requests that enable the NCO 130 to integrate with existing network controllers, orchestrators, and other systems to perform various network provisioning tasks (e.g., to build and provision a communication path between server instances) that may be included in a workflow method that may be executed by the ECS orchestrator 108. For example, the various network provisioning tasks, when executed, may provide end-to-end automated network provisioning services as part of providing on-demand edge compute service to the user 102. The NCO API 110 may further enable the ECS orchestrator 108 to receive information from the NCO 130, such as network resource information, status messages, etc. In some implementations, the NCO system 150 may be configured to receive requests directly from the user 102.

In some examples, the NCO system 150 may operate to interface various data sources, for example, for retrieving data for building, operating, and maintaining a network connection between server instances in an edge compute environment. The data sources may include internal and/or external data sources. Some example internal data sources may include location databases that may identify a location relevant to provisioning networking, a network inventory database 132 that may store unique logical constructs (i.e., unique identifiers) for VLANs, and other data sources. External data sources, for example, may include an affiliate partner's API(s), for example, for enabling authentication and/or authorization of a user 102 for access to negotiated terms (e.g., pricing discounts). Other example internal data sources and/or external data sources are possible and are within the scope of the present disclosure.

In some examples, the NCO system 150 may further operate to interface an IP address manager 140 for determining an IP block to provision to the user 102 based on the user request. For example, the IP address manager 140 may manage IP address block in a network 106. The NCO system 150 may request an IP block from the IP address manager 140, which may use the server name of the compute resource 103 that may be allocated to the user for the server instance, to resolve into a block of IP addresses. In some examples, the block may be automatically selected from a larger block of IP addresses that may be recycled for use.

In some examples, network provisioning may include automating connections to a virtual private network (VPN), to a public cloud provider, to a private cloud provider, etc. The NCO system 150 may operate to automate the building of a network path between network resources 105 between the edge compute instance and the service that is being provided to the edge compute instance, whether that service is an Internet connection, a VPN, or another type of networking service. Accordingly, the NCO system 150 may further operate to interface a network orchestrator 124. For example, the network orchestrator 124 may be configured to interoperate with various network configurators 112, where different network configurators 112 may operate to interact with different network resources in different network(s) 106. According to an example, the network configurator 112 may operate to interrogate network elements, reserve network resources in the network 106, configure ports on network resources, create a domain path between server instances, delete domain paths, release network resources, and/or perform other edge compute network provisioning interactions based on the requirements sent from the ECS orchestrator 108.

Figure 2:
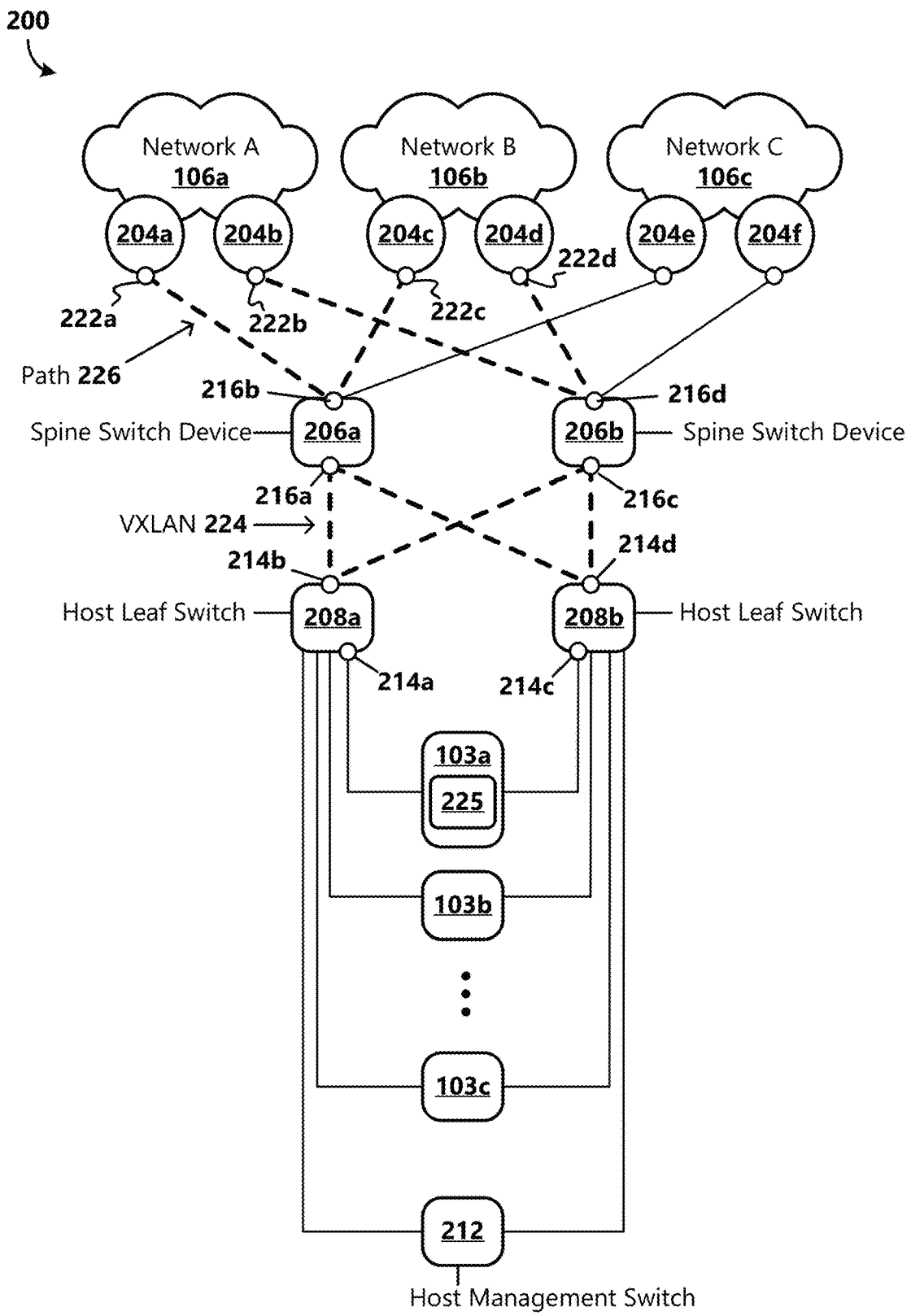
FIG. 2 is a block diagram illustrating an edge compute environment implemented in a communications network according to an example.

FIG. 2 is a schematic diagram illustrating an edge compute environment 200 implemented in a communications network in accordance with one embodiment. In general, the edge compute environment 200 of FIG. 2 illustrates one example of components of an edge site of a communications network or collection of networks 106*a-c* from which compute services may be provided to serve end users connected or otherwise in communication with the network(s) 106. As mentioned above, by providing the environment 200 at an edge site of the communications network, compute services may be provided to end users with lower latency than if the compute environment is included deeper within the network or further away from the requesting end user. It should be appreciated, however, that an edge compute system 200 may include more or fewer components than those illustrated in FIG. 2 and may be connected in other configurations than shown. Rather, the system of FIG. 2 is but one example of an edge compute environment 200 for providing edge compute services.

In the instance shown, the components of the edge compute environment 200 may be installed or associated with a network site, for example, on-premises or at a service location near a point of digital interaction. In general, an edge node in the network 106 may be a network site in which user applications may be deployed for access to services and transmission routes of the network. Further, the network 106 may include more than one public and/or private networks 106*a-c* interconnected to form a general network 106.

Each network 106*a-c* may include one or more edge devices 204*a-f* that provide gateways or that may operate as ingress/egress points for the associated network 106. In FIG. 2, a first network 106*a* may include a first edge device 204*a* and a second edge device 204*b;* a second network 106*b* may include a third edge device 204*c* and a fourth edge device 204*d;* and a third network 106*c* may include a fifth edge device 204*e* and a sixth edge device 204*f.* Each edge device 204 of the networks 106*a-c* may connect or otherwise communicate with one or more spine switch devices 206*a-b.*

One or more host leaf switches 208*a-b* may interconnect with the one or more spine switch devices 206*a-b* of the environment 200 to form a switch mesh for connecting to the networks 102 via the edge devices 204. In some instances, more or fewer spine switch devices 206 and/or host leaf switches 208 may be included in the edge compute environment 200. Further, each spine switch device 206 and host leaf switch 208 may provide redundancy failover services for a corresponding switch. One or more compute resources 103*a-c* (e.g., bare metal servers) may be connected to each host leaf switch 208. The host left switches 208 may aggregate all compute resources 103 in a rack, and spine switch devices 206 may aggregate host left switches 208 and provide consolidated connectivity to the networks 106*a-c.*

In one implementation, the compute resources 103 may be configured to host and execute applications to provide particular services to end users. For example, the compute resources 103 may be configured to provide compute services (as well as other cloud computing services) to users. The environment 200 may also include a host management switch 212 connected to the host leaf switches 208 for managing aspects of the switching mesh and communications to/from the compute resources 103. Through the environment 200 of FIG. 2, an on-demand edge compute and network provisioning may be provided.

Figure 3:
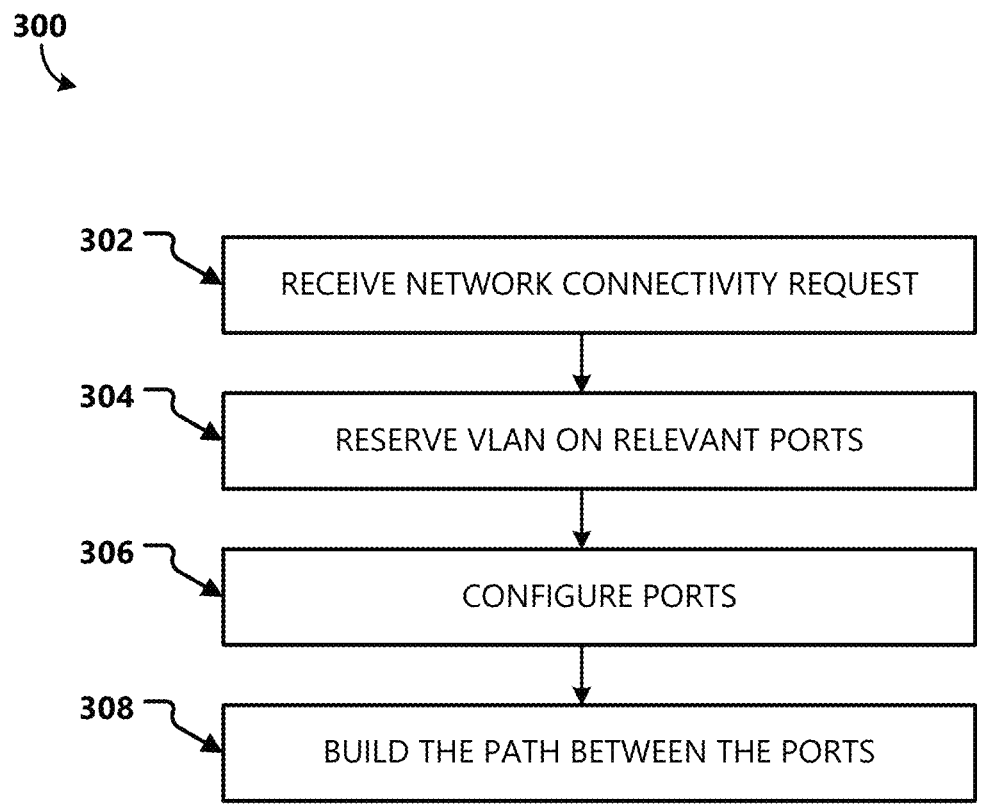
FIG. 3 is a flow chart depicting general stages of an example method for building a network between server instances in an edge compute environment according to an example.
Figure 4:
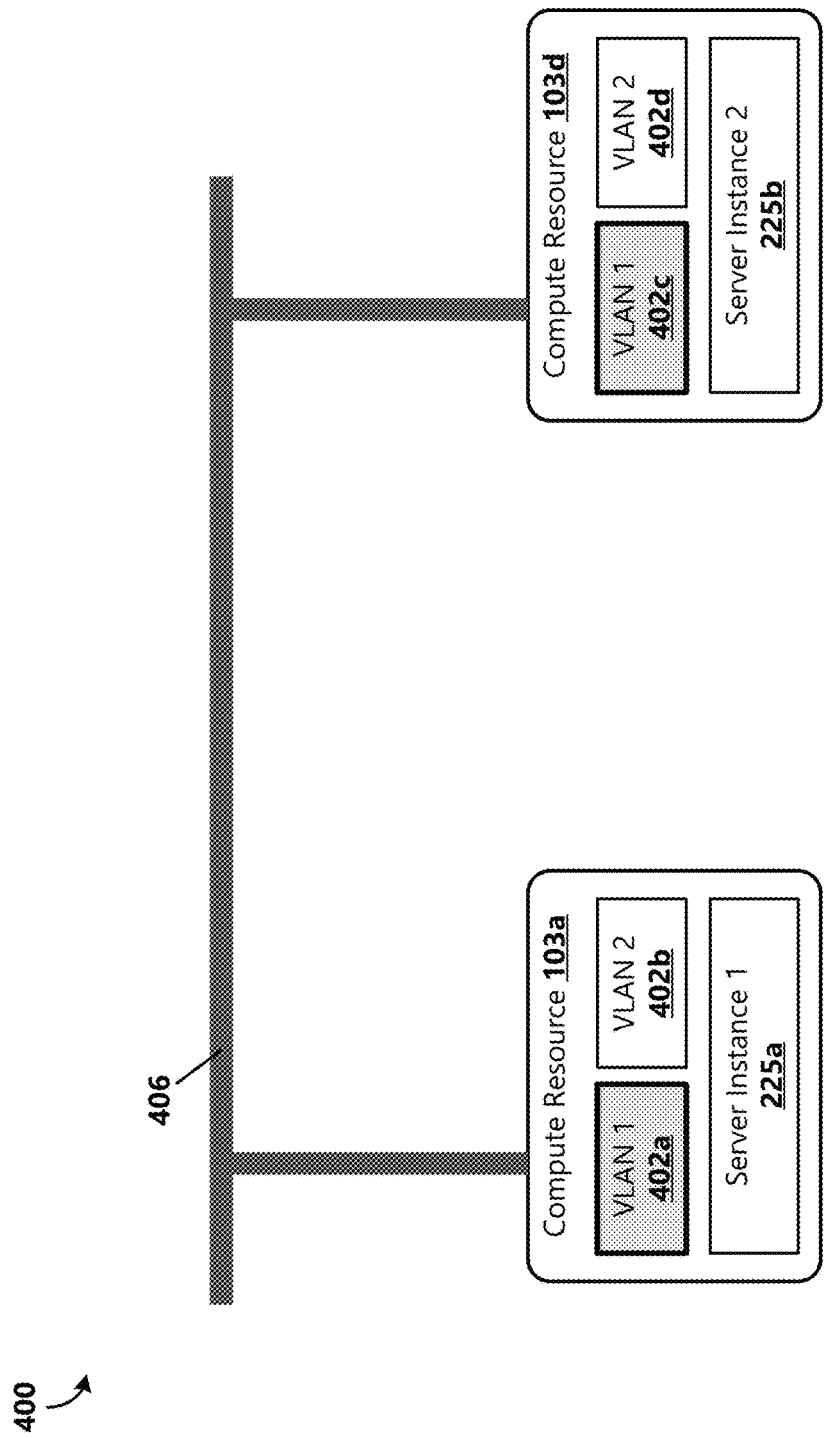
FIG. 4 is a block diagram illustrating an example edge compute environment in which server instances may be deployed and network may be built according to an example.

FIG. 3 is a flow chart depicting general stages of an example method 300 that may be performed for building a network between server instances in an edge compute environment, such as the example edge compute environment 400 depicted in FIG. 4, with which concurrent reference may be made in describing the example method 300. FIG. 4 is a block diagram of an example edge compute environment 400 implemented in a communications network 106 in accordance with an embodiment, and For example, one or more of the operations included in the example method 300 may be performed by the NCO system 150, which may operate to build a network (e.g., a VLAN 406) between server instances 225*a,b* in an edge compute environment 400 based on requirements sent from the ECS orchestrator 108. According to one example, the method 300 may be performed in response to a consolidated API call. In other examples, the method 300 may be performed in response to a plurality of API calls. The NCO system 150 may be configured to perform other methods for providing other networking service functionality, such as building a Layer-3 network that connects to the Internet, building a VPN, modifying switch configurations that the compute resources 103 are connected to, etc.

The particular use case illustrated in FIGS. 3 and 4 illustrate building a network to connect two (2) server instances 225*a,b* together according to an example. With concurrent reference now to FIGS. 3 and 4, at OPERATION 302, a request to build a network (e.g., VLAN 406) between at least 2 server instances 225a,b may be received. In some examples, the received request may be in response to a request made by a user 102, who may want to distribute a user application or service to one or more edge nodes. The received request may be associated with a request received from the user 102 to deploy the first server instance 225a and the second server instance 225b onto bare metal servers (compute resources 103a,d) at one or more edge nodes. In some examples, the requested network may be a Layer-2 network. For example, Layer-2 networking may enable the user 102 to build Layer-2 Ethernet only networks by adding one or more VLANs 406 to their server instances 225 in an edge computing network environment 400, which may facilitate Layer-2 Ethernet switching. In other examples, a user 102 may request network connectivity to create clusters of bare metal machines, virtual machines, or other instances that may be useful in a number of use cases.

In some examples, IP addresses may not by pre-assigned to the virtual network interface, which may allow the user 102 to define their own subnet size and IP addresses, which may be included in the request. In some examples, building the VLAN 406 is a multi-step process. The multiple steps may enable the edge compute system 104 to gather information from the network 106 to provision a server instance or to modify the configuration on a server instance. In some examples, VLAN assignment may be specified by the user 102 or may be automatically selected and set to a non-conflicting VLAN identifier.

At OPERATION 304, a VLAN 406 may be reserved on all relevant ports, for example, a resource reservation process may be performed by the NCO system 150 to determine and then reserve the network components by sending a request to the network inventory system 132 for these network resources 105, which may include the server names (e.g., of the first compute resource 103a and the second compute resource 103b), and identifying to which network resources 105 (e.g., host leaf switches 208) the compute resources 103a,b are connected. In some examples, prior to building the customer server instance front end or networking components, the NCO system 150 may be configured to reserve the network resources 105. For example, when configuring an edge computing service, the abstraction layer 109 may first require the server instances 225a,b to be built. Part of the provisioning of the server instances 225a,b may be executed in a build environment. The build environment ensures the secure configurations of the server instances 225a,b and allows the build environment to be dismantled after provisioning the server instances 225a,b. This scenario may allow the server instances 225a,b to be created without possible security problems. However, the server instances 225a,b may require network resources before the build is complete. As such, the NCO system 150 may operate to identify network resources 105 and reserve those network resources 105 before the server instance 225a,b builds are complete.

In response, an acknowledgement of reservations may be returned, including an IP address and a next available Virtual Wide Area Network (VWAN) for the server. The abstraction layer 109 may configure the VWAN in the servers' operating systems by applying a configuration to the ports 402a,402c on the compute resources 103a,d. The abstraction layer 109 may then further configure the server instances 225a,b. In this way, the network resources can be reserved and not taken by some other entity or system before the build of the server instances 225a,b is complete. In some examples, the NCO system 150 may operate to identify connections between network resources 105. This identification may be done automatically. Based on these identified connections, the NCO system 150 can reserve resources 105 and identify the next available resources 105. In this way, the NCO system 150 can automatically determine what network resources 105 need to be reserved.

For bare metal server compute resources 103, the NCO system 150 can provide Internet access directly to each of the configured server instances 225a,b for the edge compute service and then coordinate network configurations of the operating systems of the server instances, any switches, any routers, or other infrastructure that are at the edge location or in other parts the network. For virtual networking, a software defined network can allow for communications between different virtual machines. The customer request for edge computing, with the virtual machine, can be network segmented, network aligned, and converted to containers for configuration of the connections. The configurations can have connections to third party resources. Thus, the abstraction layer NCO system 150 can automate connections to these third-party systems, for example, third-party data centers, networks, etc.

At OPERATION 306, which may occur after the server instance 225 builds are complete, host leaf switch ports 214 on the host leaf switches 208 for each named compute resource 103a,d may be configured with the VLAN 406 that was reserved at OPERATION 304. For example, the NCO system 150 may operate to configure the host leaf switch's ports 214a,c, for each server instance 225a,b, with information about the associated compute resource 103, server instance 225, and the VLAN 406 reserved at OPERATION 304. For example, this may apply the VLAN 406 to the host leaf switch's ports 214a,c for each of the server instances 225a,b. Additionally, in some examples, the build network used to build the server instances 225a,b may be removed. For example, this may provide increased security by preventing the user 102 from being able to access other compute resources 103 that might be part of the build network.

At OPERATION 308, a domain path 226 may be configured. In some examples, the NCO system 150 may operate to perform an automated walk of the network 106 for identifying upstream network resources for creating a domain path 226 between server instances 225. For example, the user 102 may not require knowledge of network topology; based on the names of the server instances 225 the user 102 may want to connect, the NCO system 150 may operate to discover a path 226 between the server instance compute resources 103 and build the path 226 as it is being discovered.

In some examples, based on the request, a call may be made to various network elements connected to the compute resource 103 to interrogate the elements and identify neighboring network resources 105 (e.g., switches, routers) that may be available for the server instances to use for the path 226. In some examples, the NCO system 150 may identify the host ports 214a,c on the host leaf switches 208, and then may use network protocol calls (e.g., a Link Layer Discovery Protocol (LLDP)) to discover a next neighbor (e.g., spine switch device 206). The NCO 150 may further interrogate the next neighbor device, identify the uplink ports 216b,d, determine the VLANs assigned to the ports 216b,d, build the VLANs into a VXLAN domain 224, and add the host ports 214a,c to the VLAN. For example, translation may be built into the ports of the network resources 105 such that communications between networks 106 may be translated based on the VLAN that the compute resources 303a,b can operate. The process may be continued to discover the next network resource 105 within the path 226 between the server instances 225. Additionally, when the domain path has been configured, VLAN network connectivity may be provided between server instances 225.

Figure 5A:
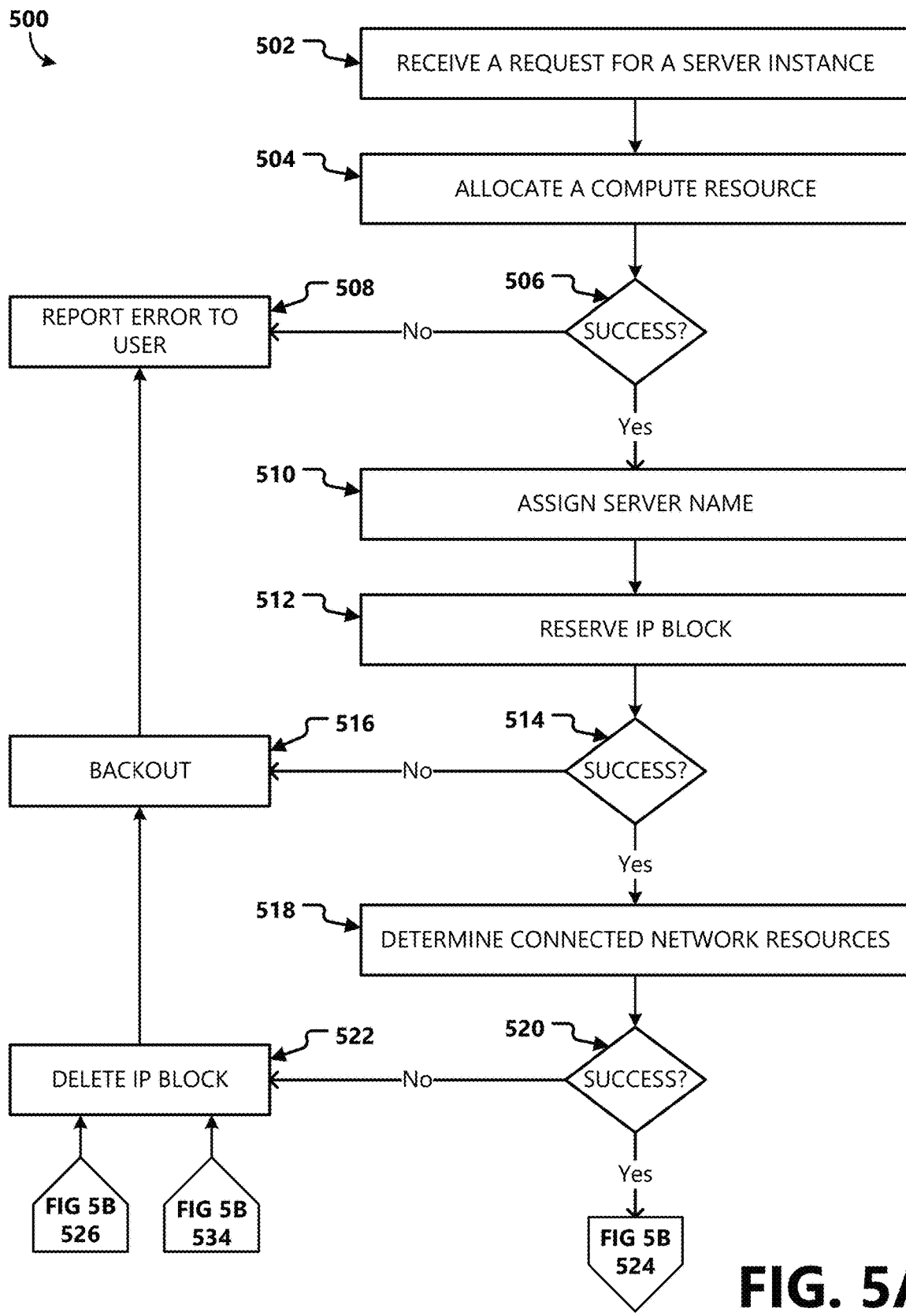
FIGS. 5A-C illustrate a flow chart depicting general stages of an example method for deploying server instances and building a network between server instances in an edge compute environment according to an example.

In some examples, the ECS orchestrator 108 may use the SCO system 160 and the NCO system 130 to perform various operations of a workflow method for providing on-demand compute and network orchestration and configuration in an edge computing network environment 200,400 according to an embodiment. An example workflow method 500 is provided in FIGS. 5A-5C. When things fail during the workflow method 500, depending on where they fail, decisions have to be made on what needs to be backed out of, if anything. For example, if changes have been made to the network, the changes that have been made to the network need to be understood and backed out accordingly, working up the chain until there are no other changes to back out of, and then a failure message may be relayed to the user. Example steps for backing out of the workflow method 500 are included in the steps on the left side of the flow chart illustrated in FIG. 5 and described below (OPERATIONS 508,516,522,534,540).

With reference now to FIG. 5, at OPERATION 502, a request for edge computing resources may be received from a user 102. For example, the user 102 may request edge compute services via a user interface 114 provided by the ECS orchestrator 108. The request may include criteria for an edge compute resource 103 (e.g., server size, a market area and/or geographic location. Other example criteria may include latency requirements, bandwidth requirements, cost/pricing, security level). As explained previously, the edge compute system 104 may be configured to operate as an API-defined server and network orchestrator that can automatically orchestrate and deploy server instances 225 in an edge compute environment and provision the network on demand. In some examples, network provisioning may include building networking components between the server instances 225. In some examples, the ECS orchestrator 108 may determine or interpret what the user 102 is requesting for edge compute and networking services.

At OPERATION 504, a compute resource 103 may be allocated to the requested customer server instance 225. For example, to ensure that the compute resource 103 is available for the requested server instance 225, the SCO system 160 may request to reserve the compute resource 103 in the compute inventory system 134.

At DECISION OPERATION 506, a determination may be made as to whether a compute resource 103 was successfully allocated. In some examples, the ECS orchestrator 108 may poll the SCO system 160 for status until a status of success is received. If, after a timeout period, a success status message is not received, or if a failure status message is received, an error may be reported to the user 102 via the UI 114 at OPERATION 508.

When a success message is received, a server (e.g., compute resource) name may be assigned to the server instance 225 at OPERATION 510. For example, the server name may be determined based on a server naming system used by systems in the network 106. In some examples, the SCO system 160 may communicate the server name to the ECS orchestrator 108, which may assign the server name to the server instance 225 configuration.

At OPERATION 512, resources may be gathered for the network (e.g., an IP block may be reserved). For example, the ECS orchestrator 108 may make a call to the ECO API 110 to request an IP block for the server instance 225. In some examples, the API call may be one of a plurality of calls that may be made to the NCO system 150 to provision a network path for the server instance 225. In other examples, the API call may be a consolidated API call to the EPO system 150 to perform various operations that may automatically provision the network to provide connectivity to the server instance 225. The NCO system 150 may be configured to request an IP block from the IP address manager 140, which may respond to the request with an inventory of available IP blocks. In some examples, the NCO system 150 may intelligently determine the IP block. For example, IP blocks may be continually provisioned, deprovisioned, etc. As such, selecting a next block of IP address of available IP addresses may not be efficient, as there may be various gaps of IP blocks. Accordingly, the NCO system 150 may intelligently determine an IP block that may use the IP address space efficiently, and reserve the IP block for the server instance 225.

At DECISION OPERATION 514, a determination may be made as to whether the IP address block has been reserved. In some examples, the ECS orchestrator 108 may poll the SCO system 160 for status until a status of success is received. It after a timeout period, a success status message is not received, or if a failure status message is received, the SCO system 160 may be instructed to back out of the IP block reservation process at OPERATION 516, and at OPERATION 508, an error may be reported to the user 102 via the UI 114.

When a success message is received, at OPERATION 518, network resources 105 connected to the compute resource 103 that has been reserved for the server instance 225 may be determined. For example, with concurrent reference to the example edge compute environment 200 illustrated in FIG. 2, host ports 214a,c that the compute resource 103 is connected to may be requested from the network inventory system 132 by the NCO system 150.

At DECISION OPERATION 520, a determination may be made as to whether the requested port information has been obtained. If, after a timeout period, the port information cannot be obtained, the IP block may be deleted by the ECS orchestrator 108 and a request may be made to delete and delete the reserved IP block from the IP address manager 140 at OPERATION 522. The SCO system 160 may be instructed to back out of the IP block reservation process at OPERATION 516, and at OPERATION 508, an error may be reported to the user 102 via the UI 114.

Figure 5B:
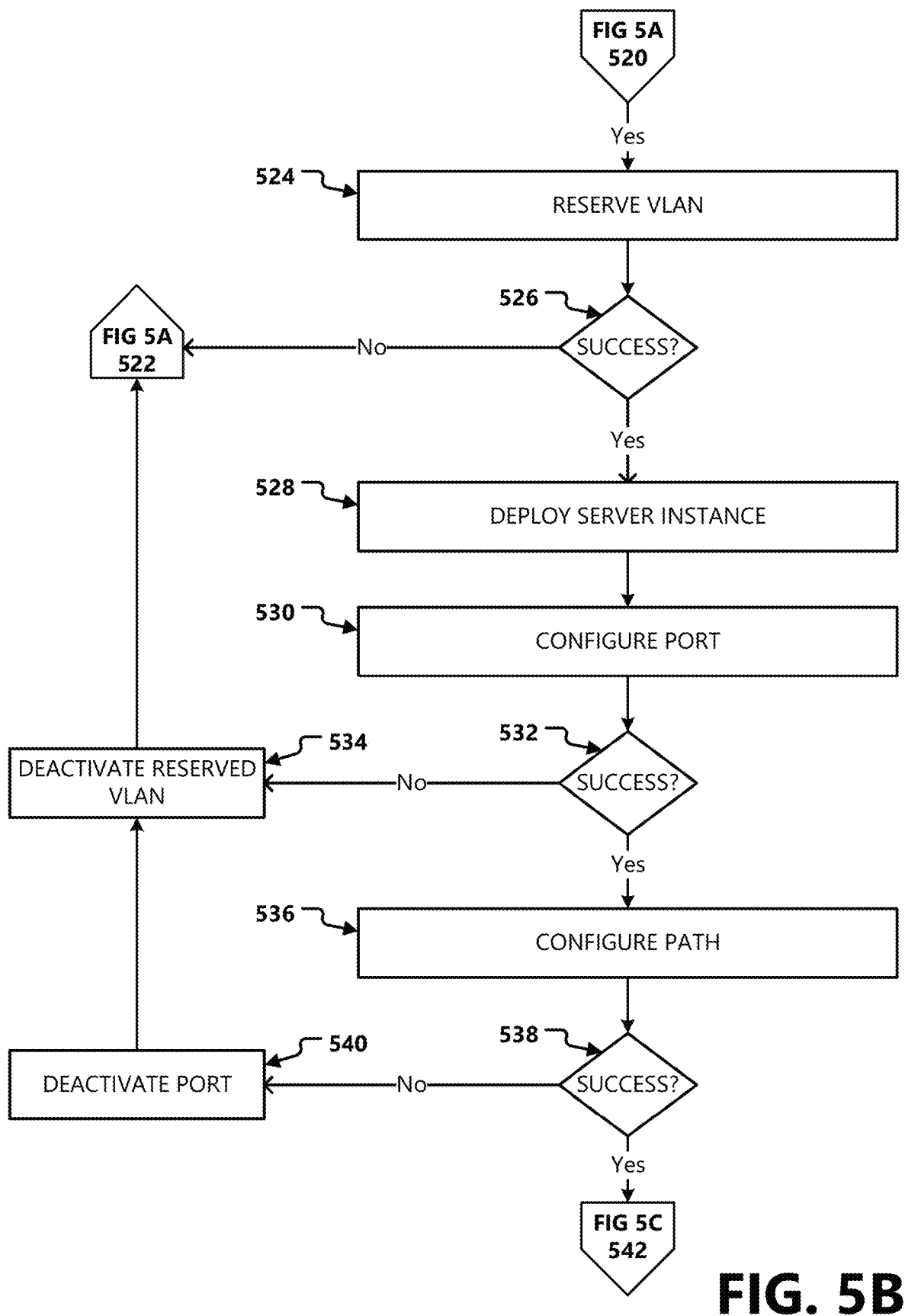

When a success message is received, the workflow method 500 may continue to FIG. 5B, where at OPERATION 524, a VLAN may be reserved on relevant ports. For example, the NCO system 150 may reserve the VLAN at the first port 214 of the first host leaf switch 208a. For example, a resource reservation process may be performed, where a subinterface may be created with a next available VLAN to reserve it in the network 106. As described above, the NCO system 150 may be configured to reserve network resources 105 prior to building the server instance front end or networking components.

At DECISION OPERATION 526, a determination may be made as to whether the VLAN has been successfully reserved. In some examples, the ECS orchestrator 108 may poll the NCO system 150 for status until a status of success is received. If, after a timeout period, a success message is not received, the IP block may be deleted by the ECS orchestrator 108 and a request may be made to delete and delete the reserved IP block from the IP address manager 140 at OPERATION 522. The SCO system 160 may be instructed to back out of the IP block reservation process at OPERATION 516, and at OPERATION 508, an error may be reported to the user 102 via the UI 114.

When a success message is received, at OPERATION 528, the customer server instance 225 may be deployed on the compute resource 103. For example, the SCO system 160 may operate to build the server instance front end, which may include creating a configuration script based on the user request, which may be used by the compute orchestrator 136 to configure the compute resource 103. In some examples, the compute resource 103 may then be instructed to reboot, wherein configuration settings for the server instance 225 may be applied on the reboot may provide instructions for obtaining an operating system (OS) image, which may be applied to the server instance 225. The server instance 225 may further be instructed to reboot and execute the configuration script to apply defined network connection settings.

At OPERATION 530, the first port 214 of the first host leaf switch 208a may be configured with customer-specific information/values. Additionally, the build network used to build the server instance 225 may be removed. For example, removing the build network may provide increased security by preventing the user 102 from being able to access other compute resources 103 that might be part of the build network. At this point, there is not yet connectivity from the first host leaf switch 208a to a first edge device 204 (e.g., provider edge router that provides a gateway or ingress/egress for the associated network 102).

At DECISION OPERATION 532, a determination may be made as to whether the first port 214 has been successfully configured. In some examples, the ECS orchestrator 108 may poll the NCO system 150 for status until a status of success is received. It after a timeout period, a success message is not received, the reserved VLAN may be deactivated at OPERATION 534. For example, the NCO system 150 may be instructed to delete the previously reserved subinterface from the switch port(s) (e.g., first port 214 of the first host leaf switch 208a) to remove the VLAN from the host leaf switch 208a. Additionally, OPERATIONS 522, 516, and 508 may be performed to back out of the workflow method 500.

When a success message is received, the workflow method 500 may proceed to OPERATION 536, where a path 226 may be configured. For example, the path 226 may be configured at build time, which provides increased security and increased flexibility in controlling and defining how the path 226 is built to connect server instances 225 in the network 106. In some examples, the NCO system 150 may be instructed to perform various operations for configuring the path 226. One operation may include a network walk to determine spine switch devices 206 and edge devices 204. For example, network protocol calls (e.g., a Link Layer Discovery Protocol (LLDP)) may be used to discover a neighbor network device 105. Another operation may include determining the VLANS provisioned on the uplink ports 216b,d on the spine network devices 206. Another operation may include determining a next available VLAN. For example, the next neighbor device and its uplink ports may be identified, and the VLANS assigned to the ports may be determined. Another operation may include building spine subinterfaces. In some examples, a VXLAN 224 may be built and a VNI (unique identifier) may be assigned to VXLAN domains between the host leaf switches 208 and the spine switch devices 206) to encapsulate traffic inside the VXLAN 224. Another operation may include building VLAN translation into the ports 216a,c for translating communications between the first host leaf switches 208 and the spine switch devices 206 (e.g., based on the VLAN between the host leaf switches 208 and the compute resource 103 that the server instance 225 knows how to operate). For example, a next available VLAN may be obtained on the connections between the spine switch devices 206 and the edge devices 204, and translation may be built into the edge device ports 222, such that communications between the edge devices 204 and the server instances 225 may be translated based on the VLAN between the host leaf switches 208 and the server instance 225.

At DECISION OPERATION 538, a determination may be made as to whether the path 224 has been successfully provisioned. In some examples, the ECS orchestrator 108 may poll the NCO system 150 for status until a status of success is received. If, after a timeout period, a success message is not received, at OPERATION 540, the port 214 on the host leaf switch 208 may be deactivated. For example, the subinterface may be set back to reserved, and other port deactivation steps may be performed. Additionally, OPERATIONS 522, 516, and 508 may be performed to back out of the workflow method 500.

Figure 5C:
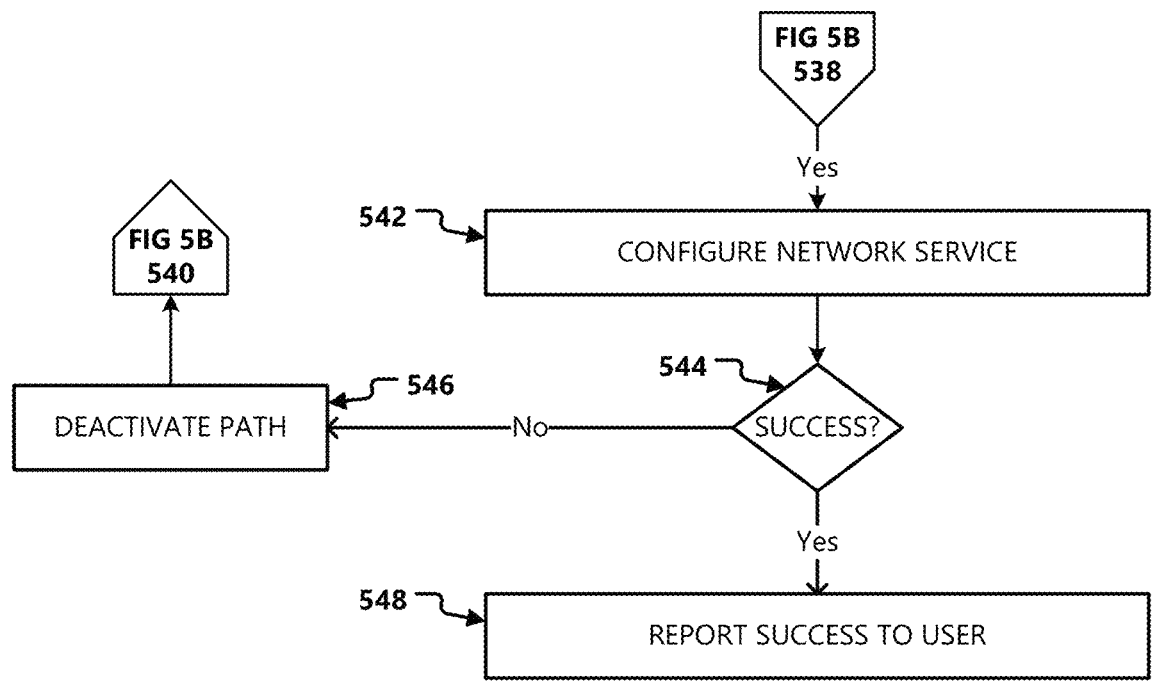

When the path 224 has been successfully provisioned, the workflow method 500 may continue to FIG. 5C, where at OPERATION 542, the network service may be configured for the server instance 225. For example, network resources 105 may be configured with server instance-specific details (e.g., server name, server IP address, circuit ID info), which may be applied to the network resources 105, and a path 226 may connect the server instance 225 to the interfaces 122 on the edge devices 104. At this point, the server instance 225 may have internet connectivity.

At DECISION OPERATION 538, a determination may be made as to whether the service is active and has network connectivity. In some examples, the ECS orchestrator 108 may poll the NCO system 150 for status until a status of success is received. If, after a timeout period, a success message is not received, at OPERATION 546, the path 226 may be deactivated. For example, the NCO system 150 may be instructed to perform various operations for deactivating the path 226 that was built at OPERATION 536. One example operation may include a network walk to determine spine switch devices 206 and edge devices 204. For example, network protocol calls (e.g., a Link Layer Discovery Protocol (LLDP)) may be used to discover a neighbor network device 105. Another operation may include determining the VLANS provisioned on the ports on the spine switch devices 206. Another operation may include determining a next available VLAN. For example, the next neighbor device and its uplink ports may be identified, and the VLANS assigned to the ports may be determined. Another operation may include building spine subinterfaces, removing the VXLAN 224 on the spine switch devices 206 and the host leaf switches 208, and removing the translation that was built into the ports at OPERATION 536. Additionally, OPERATIONS 540, 522, 516, and 508 may be performed to back out of the workflow method 500.

When the service has been configured successfully, the workflow method 500 may proceed to OPERATION 548, where a message may be provided to the user 102, via the API 114, notifying the user 102 that the server instance 225 is ready for use. The message may further include the IP address of the server instance 225, the server name, and other useful information.

In multi-tiered orchestration, a challenge is concurrency and how to deal with concurrent requests to scale. In some examples, queuing mechanisms may be implemented between different layers (NaaS, MaaS, ACT, L2 and L3

Activation). When accessing resources from the network, decisions on which resources to utilize may be made before configuring them. When concurrent requests are run, queues may be implemented to temporarily store information retrieved from the network before configuration to avoid race conditions associated with accessing a same network resource.

The components to implement the systems and methods described herein can function as computing devices, communication devices, etc. The components may be formed from software, hardware, or a combination of software and hardware. Some of the components may be virtual, where one or more software instances of the component is executed on a computing device. However, some components may be physical, e.g., bare metal servers. The hardware components may include one or more of, but is not limited to, one or more processors, one or more input interfaces, one or more output interfaces, and one or more memory components. Examples of the processors as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core® family of processors, the Intel® Xeon® family of processors, the Intel® Atom® family of processors, the Intel Itanium® family of processors, Intel® Core® i5-4670K and i7-4770K 22 nm Haswell, Intel® Core® i5-3570K 22 nm Ivy Bridge, the AMD® FX® family of processors, AMD® FX-4300, FX-6300, and FX-8350 32 nm Vishera, AMD® Kaveri processors, Texas Instruments® Jacinto C6000® automotive infotainment processors, Texas Instruments® OMAP® automotive-grade mobile processors, ARM® Cortex®-M processors, ARM®. Cortex-A and ARM926EJ-S® processors, other industry-equivalent processors, and may perform computational functions using any known or future-developed standard, instruction set, libraries, and/or architecture. The processors can also include one or more of, but are not limited to, application specific integrated circuits (ASIC), field programmable gate arrays (FPGA), other central processing units, a system-on-chip (SOC), or other types of processors.

The memory components may be disk drives, optical storage devices, solid-state storage devices, such as a random access memory ("RAM") and/or a read-only memory ("ROM"), which can be programmable, flash-updateable and/or the like. However, in at least some configurations, the memory components are ternary content addressable memory/reduced latency dynamic random access memory (TCAM/RLDRAM) that are capable of reduce latency, high-speed switching to provide high-speed access to the data stored within the memory. Additionally or alternatively, each component may have two or more processors, each with dedicated memory.

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

We claim:

1. A method for providing automated network configuration for edge computing, comprising:

receiving a request for a user server instance in an edge compute network;

translating the request into compute provisioning tasks and networking provisioning tasks; and causing a network configurator in communication with network resources to execute the networking provisioning tasks, wherein the network provisioning tasks comprise:

reserving a VLAN for the server instance on a first port of a first network resource connected to a compute resource;

configuring the first port of the first network resource to translate VLAN communications between the compute resource and the first network resource;

automatically discovering a path between the first network resource and an egress network resource in the edge compute network; and building the path between the first network resource and the egress network resource as the path is discovered, wherein prior to reserving the VLAN:
receiving the inventory of available IP address blocks; and
based on utilization of the inventory of available IP address blocks, determining the IP address block for the server instance.

2. The method of claim 1, wherein prior to building the path:
receiving an indication that the server instance is built; and
removing a build network provided for securely building the server instance.

3. The method of claim 1, wherein building the path comprises:
determining a next available VLAN on a second port of the first network resource;
discovering a second network resource upstream from the first connected network resource;
configuring a first port of the second network resource to translate VLAN communications between the first network resource and the second network resource;
determining a next available VLAN on a second port of the second network resource;
discovering a third network resource upstream from the second network resource, wherein the third network resource is the egress network resource;
configuring a first port of the egress network resource to translate VLAN communications between the second network resource and the egress network resource; and
building a spine subinterface on the egress network resource.

4. The method of claim 3, wherein:
the first network resource is a host leaf switch;
the second network resource is a spine switch device; and
building the path further comprises building a VXLAN, comprising:
reserving a second VLAN for the server instance on a first port of a second host leaf switch connected to the compute resource;
configuring the first port of the second host leaf switch to translate VLAN communications between the compute resource and the first network resource;
determining a next available VLAN on a second port of the second host leaf switch;
discovering a second spine switch device upstream from the second host leaf switch;
configuring a first port of the second spine switch device to translate VLAN communications between the second host leaf switch and the second spine switch device;
discovering a second egress network resource upstream from the second spine switch device;
configuring a first port of the second egress network resource to translate VLAN communications between the second spine switch device and the second egress network resource;
building a spine subinterface on the second egress network resource;
determining a VXLAN on the second ports of the first and second host leaf devices; and
configuring the first ports of the first and second spine switch devices to translate VXLAN communications between the first and second host leaf devices and the first and second spine switch devices.

5. The method of claim 3, further comprising:
in response to receiving an indication of a failure in reserving the VLAN, configuring the first port of the first network resource, discovering the path between the first network resource and the egress network resource in the edge compute network, or building the path, backing out of the reservation, configuration, discovery, or build according to a backout workflow based on where the failure occurs.

6. The method of claim 1, wherein causing the network configurator to perform the network provisioning tasks comprises calling an application programming interface (API) of a network configuration orchestrator to open communication between an edge compute system orchestrator and the network configurator, and wherein the method further comprises calling an application programming interface (API) of a server configuration orchestrator to open communication between an edge compute system orchestrator and a compute orchestrator in communication with compute resources for executing the compute provisioning tasks.

7. The method of claim 6, wherein prior to reserving the VLAN for the server instance:
reserving the compute resource in a compute inventory system; and
assigning a compute resource name to the server instance.

8. The method of claim 7, where prior to configuring the first port, deploying the server instance on the compute resource.

9. A system for providing automated network configuration for edge computing, the system comprising:
at least one processor;
memory operatively connected to the at least one processor and storing instructions that, when executed by the at least one processor, cause the system to:
receive a request for a server instance in an edge compute network;
translate the request into compute provisioning tasks and networking provisioning tasks; and
causing a network configurator in communication with network resources to perform the network provisioning tasks, including:
reserve a VLAN for the server instance on a first port of a first network resource connected to a compute resource;
configure the first port of the first network resource to translate VLAN communications between the compute resource and the first network resource;
automatically discover a path between the first network resource and an egress network resource in the edge compute network; and
build the path between the first network resource and the egress network resource as the path is discovered,
wherein prior to reserving the VLAN, the system if further operative to:
receive the inventory of available IP address blocks; and
based on utilization of the inventory of available IP address blocks, determine the IP address block for the server instance.

10. The system of claim 9, wherein prior to building the path, the system is operative to:
receive an indication that the server instance is built; and
remove a build network provided for securely building the server instance.

11. The system of claim 9, wherein in building the path, the system is operative to:
   determine a next available VLAN on a second port of the first network resource;
   discover a second network resource upstream from the first connected network resource;
   configure a first port of the second network resource to translate VLAN communications between the first network resource and the second network resource;
   determine a next available VLAN on a second port of the second network resource;
   discover a third network resource upstream from the second network resource, wherein the third network resource is the egress network resource;
   configure a first port of the egress network resource to translate VLAN communications between the second network resource and the egress network resource; and
   build a spine subinterface on the egress network resource.

12. The system of claim 11, wherein:
   the first network resource is a host leaf switch;
   the second network resource is a spine switch device; and
   building the path further comprises building a VXLAN.

13. The system of claim 12, wherein in response to receiving an indication of a failure in reserving the VLAN, configuring the first port of the first network resource, discovering the path between the first network resource and the egress network resource in the edge compute network, or building the path, the system is further operative to back out of the reservation, configuration, discovery, or build according to a backout workflow based on where the failure occurs.

14. The system of claim 9, wherein causing the network configurator to perform the network provisioning tasks comprises calling an application programming interface (API) of a network configuration orchestrator to open communication between an edge compute system orchestrator and the network configurator, and wherein the system is further operative to call an application programming interface (API) of a server configuration orchestrator to open communication between an edge compute system orchestrator and a compute orchestrator in communication with compute resources for executing the compute provisioning tasks.

15. The system of claim 14, wherein prior to reserving the VLAN for the server instance, the system is further operative to:
   reserve the compute resource in a compute inventory system; and
   assign a compute resource name to the server instance.

16. The system of claim 15, where prior to configuring the first port, the system is further operative to deploy the server instance on the compute resource.

* * * * *